US009079521B1

(12) United States Patent
Bowe

(10) Patent No.: US 9,079,521 B1
(45) Date of Patent: Jul. 14, 2015

(54) PROTECTIVE COVER FOR CHILD CARRYING DEVICE

(71) Applicant: Elizabeth Irene Bowe, San Diego, CA (US)

(72) Inventor: Elizabeth Irene Bowe, San Diego, CA (US)

(*) Notice: Subject to any disclaimer, the term of this patent is extended or adjusted under 35 U.S.C. 154(b) by 0 days.

(21) Appl. No.: 14/580,113

(22) Filed: Dec. 22, 2014

Related U.S. Application Data

(60) Provisional application No. 61/921,356, filed on Dec. 27, 2013.

(51) Int. Cl.
*A47C 7/62* (2006.01)
*B60N 2/60* (2006.01)
*A47D 15/00* (2006.01)
*B62B 9/14* (2006.01)
*A01K 1/00* (2006.01)

(52) U.S. Cl.
CPC ............... *B60N 2/6036* (2013.01); *A01K 1/00* (2013.01); *A47D 15/00* (2013.01); *B62B 9/142* (2013.01)

(58) Field of Classification Search
CPC .......... A47D 15/00; A47C 7/66; A47C 31/11; B60N 2/2881; B60N 2/60; B60N 2/6036; A47G 9/068; B26B 9/142; A01K 1/00

USPC ......................................... 297/184.13, 219.12
See application file for complete search history.

(56) References Cited

U.S. PATENT DOCUMENTS

| 5,018,229 | A | * | 5/1991 | Eberhart | 5/417 |
| 5,074,616 | A | * | 12/1991 | Smith | 297/184.13 |
| 6,012,756 | A | | 1/2000 | Clark-Dickson | |
| 7,083,228 | B1 | * | 8/2006 | Al Sawan | 297/184.13 |
| 8,550,548 | B2 | * | 10/2013 | Gibbons et al. | 297/184.13 |
| 2012/0280543 | A1 | | 11/2012 | Moussa et al. | |
| 2013/0292973 | A1 | * | 11/2013 | Loaiza | 297/184.12 |

OTHER PUBLICATIONS

Cozy Happens™ Infant Car Seat Canopy & Tummy Time Mat [Online], [Retrieved on Dec. 14, 2014] Retrieved From the Internet <https://www.itzyritzy.com/cozy-happens-infant-car-seat-canopy-and-tummy-time-mat>.

* cited by examiner

*Primary Examiner* — Philip Gabler
(74) *Attorney, Agent, or Firm* — Maymanat S. Afshar

(57) ABSTRACT

The present invention is directed to a protective cover for a child or other occupant in a carrying device. The protective cover is light, easy to use, and has adjustable straps, a storage compartment, handle access, lightweight fabric weights, and a window for providing access to the occupant, while simultaneously providing viewing ability to the outside environment for the occupant.

19 Claims, 7 Drawing Sheets

PROTECTIVE COVER FOR CHILD CARRYING DEVICE

CROSS-REFERENCE TO RELATED APPLICATIONS

This application claims the benefit of U.S. Provisional Application No. 61/921,356, filed on Dec. 27, 2013.

FIELD OF THE INVENTION

The present invention is directed to a protective cover adapted to be removably secured to child carrying devices, and further relating to covers that are suitable for use with child seats, strollers, infant carriers and pet strollers. More particularly, the invention relates to covers that provide a barrier from the sun, wind and other natural elements, while providing an access port for a child to observe the external environment through the cover, as well as facilitating parent observation of the child. Furthermore, the invention provides for the parent to access the child without removing the protective cover. In addition, the present invention is also directed to a method for covering a child carrying device or stroller.

BACKGROUND OF THE INVENTION

The following description is not an admission that any of the information provided herein is prior art or relevant to the present invention, or that any publication specifically or implicitly referenced is prior art. Any publications cited in this description are incorporated by reference herein. Where a definition or use of a term in an incorporated reference is inconsistent or contrary to the definition of that term provided herein, the definition of that term provided herein applies and the definition of that term in the reference does not apply.

Currently, most conventional strollers, infant car seats and child carriers are equipped with a small, foldable shade intended to shade the child's eyes and face from the sun (see, for example, U.S. Pat. No. 6,012,756). These shades, however, provide little or no shade for the rest of the child's face and body, and little or no protection from wind, rain and other natural elements (see, for example, U.S. Pat. No. 8,550,548, where only a portion of the child seat is covered). Some parents often lay a blanket over the top of the stroller, infant car seat or child carrier to provide minimal additional protection. However, applying a blanket in this manner can often result in the blanket dropping off and blowing in the wind.

Additionally, this type of protection blocks the parent's ability to view the child and simultaneously blocks the child's ability to view the external environment. Some available products comprise blankets that are attached to the car seat or stroller, though these products have limitations (see, for example, US Publication 2012/0280543). Products with straps are not adjustable, and do not provide a secure fit to the carrying device. Other products that have elastic bands, snaps or drawstrings to fit the product to the carrying device can be cumbersome because removing the straps requires movement of the carrying device resulting in disturbing a sleeping baby. For example, a cover called a "pod" by Itzy Ritzy blocks the child's ability to see the environment outside the cover. Furthermore, while the elastic band of such cover may keep the cover tight around the carrier, it makes it more difficult to put the cover on and off. In addition, the cover does not remain open for an awake baby, requiring the parent or other caretaker to constantly remove the cover to check the status of the baby.

Although some products provide various methods to view the child, these covers have to remain open during use; remain closed without a person's intervention to hold open; or include mesh or plastic coverings that disrupts the ability to view and access the child. Further, most covers need to be removed while the cover is not in use. Since such covers do not provide a self-stowing feature, a caregiver must carry the cover with him/her in addition to other items while caring for a child.

Some available shades, for example the one offered by Car Seat Canopy, has limited access to the handle of the car seat. When the shade is opened, the caregiver must grab the handle with the blanket over it, causing potential risk of the carrier slipping.

An additional problem busy parents face is not having enough hands for all theirs and baby's items. Diaper bags can be cumbersome and fall off the shoulder or require a hand to hold. Many parents would prefer not to carry a diaper bag but need somewhere to keep a few essential items.

Therefore, there exists a need for a protective cover that does not have the aforementioned limitations and provides caregivers a cover for any child carrying device that is easy to use, substantially protects the child (or other occupant) from the sun and other natural elements, allows consistent access to the handle of the carrying device, and provides storage for essential items allowing a free hand.

SUMMARY OF THE INVENTION

The present invention is directed to a protective device for child carrying devices, and especially relating to covers that are suitable for use with child seats, strollers, infant carriers, pet strollers, and the like. In an embodiment of the invention, the device is a cover or a shade. In another embodiment of the present invention, the cover is used for a carrying device to accommodate an occupant, wherein the occupant comprises an infant, a child or a pet. In certain embodiments, the invention provides protection for a multiple-occupant carrying device such as a double or triple stroller. A further embodiment of the invention provides a cover that substantially protects the occupant, such as a child, from the sun, wind, rain, natural and environmental elements while being securely attached to the carrying device with adjustable straps. In addition to providing protection from the natural and environmental elements, the present invention also provides protection from undesired touching of the child by others, as well as providing a darkened environment that is conducive for a sleeping child.

In another embodiment of the present invention, the cover provides a window access to both the parent and the child for viewing purposes and simultaneously providing an access point for the parent to physically access the child without removing the device. In an embodiment of the invention, the parent is a caregiver, or a pet owner. In a further embodiment of the present invention, the window is optionally open or closed without any intervention from the parent. In another embodiment, the cover provides a handle access panel that can be opened and closed to provide access to the carrier handle while still providing coverage for the occupant. In one embodiment, the cover is equipped with light weights to prevent blowing of the cover in the wind without the use of elastic, snaps or other methods which typically require disturbing the carrying device and also undesirably limiting the child's sitting space. In another embodiment, the cover incorporates reflective materials that provide enhanced safety and visibility in the dusk and dark hours. In yet another embodiment, the cover provides a pocket for storage of diapers, keys and other items such as toys, allowing the caregiver to travel without multiple bags, ensuring the parent's freedom to move freely and have less distraction when caring for the child occupying the carrier.

In one embodiment, the present invention comprises a protective cover configured to be removably fitted to an occupant carrying device comprising a plurality of flexible sheets, wherein said sheets form an elongated panel comprising a top surface and a bottom surface; a built-in pocket, wherein said pocket is integrated into said elongated panel by joining together a portion of said top surface to a corresponding portion of said bottom surface; a window, wherein said window is cut into said elongated panel; a window flap; a plurality of adjustable straps, wherein said adjustable straps are configured to attach said protective cover to the handle of said carrying device; and a plurality of weights, wherein said weights are integrated into said protective cover.

In another embodiment, the handle access panel is about 3 inches to 7 inches in length, and about 4 inches to 8 inches in width; wherein the bottom border of said handle access panel is located about 18 inches to 22 inches from the bottom edge of said elongated panel; and wherein said handle access is fastened to said protective cover by a fastening mechanism comprising elastic, buttons, hook-and-loop tape, or snaps.

In another embodiment, the carrying device is selected from a group consisting of an infant seat, a child seat, a stroller, a multiple occupant stroller, or a pet stroller.

In yet another embodiment, the occupant is an infant, a child, or a pet.

In another embodiment, the flexible material further comprises lycra, polyester, cotton-polyester blend, rayon, flannel, fleece, cotton, or any combination thereof.

In still another embodiment, the adjustable straps comprise flexible fabric and removably attach said protective cover to the carrying device, and wherein said adjustable straps are located in the center of said top surface, and wherein said adjustable straps are about 9 inches to 14 inches apart. In yet another embodiment, the adjustable straps removably attach said protective cover to said carrying device, wherein said adjustable straps are located in the center of said top surface, and wherein said adjustable straps are about 9 inches to 13 inches apart.

In another embodiment, said adjustable straps are located along the top and bottom edge of the perimeter of said protective cover.

In yet another embodiment, the built-in pocket is configured to provide storage. In yet another embodiment, the window flap is fastened to said protective cover by a fastening mechanism comprising elastic, buttons, hook-and-loop tape, or snaps, and in an embodiment, the window flap is folded and secured to the protective cover by hook-and-loop tape to secure said window in an open position. Furthermore, the window is located below said built-in pocket and is further located in front of said occupant's face to provide visual access for said occupant, wherein said window flap provides a dark environment and further comprises clear, opaque, semi-opaque, or any such combination of colored materials, and a mesh material that is optionally colored, clear, opaque, or semi-opaque.

In an embodiment, such as for a car seat, the protective cover includes a handle access panel that is integrated into the elongated panel, wherein the handle access panel is located centered between adjustable straps, when adjustable straps are located in the center of the top surface of the protective cover. In yet another embodiment, the handle access panel is fastened to said protective cover by a fastening mechanism comprising elastic, buttons, hook-and-loop tape, or snaps. In another embodiment, the handle access panel can be opened to allow access to the handle of the carrier or closed to provide full protection of the occupant from the natural environment.

In another embodiment, the handle access is manufactured of the same material as the protective cover, for example, lycra, polyester, cotton-polyester blend, rayon, flannel, fleece, cotton, or any combination of the aforementioned materials. The handle access panel, however, may not be manufactured of the same material as the protective cover.

In a further embodiment, said window flap(s) comprise one layer of transparent material and a second layer of opaque material, wherein where said layer of opaque material may be in the open position, and said layer of transparent material may be in the closed position, further providing an occupant fresh air and visual access.

In yet another embodiment, the weights are integrated into the four corners of the elongated panel by attachment means. In an embodiment, the attachment means is sewing.

In still another embodiment, the weights are selected from fabric weights, drapery weights, and weighed rope and are about 0.5 to 2 ounces each. In another embodiment, the weights are about 1 ounce each.

In another embodiment, the protective cover protects the occupant from the external environment. In still another embodiment, the protective cover comprises air-permeable material, non-air-permeable material, or a combination thereof.

In one embodiment, the elongated panel is about 40 inches to 46 inches long and about 19 inches to 29 inches wide for a car seat, and about 50 inches to 54 inches long and about 30 inches to 34 inches wide for a stroller.

In yet another embodiment, the adjustable straps are about 9 inches to 14 inches apart for a child seat. In an embodiment, the adjustable straps are about 11 inches apart for a child seat, and about 14 inches apart for a stroller.

In still another embodiment, the present invention comprises a protective cover configured to be removably fitted to a car seat and to a protective cover for covering the occupant's entire body, said protective cover comprising a plurality of flexible sheets, wherein said sheets form an elongated panel comprising a top surface and a bottom surface that faces said occupant, wherein said top and said bottom surface are attached along the outer edges of said top surface and said bottom surface; a built-in pocket, wherein said built-in pocket is integrated into said elongated panel by joining a portion of said top surface to a corresponding portion of said bottom surface to create a compartment area; a window, wherein said window is cut into said elongated panel, wherein said window is located below said built-in pocket, and said window is further located in front of said occupant's face; a window flap, wherein said flap is folded and secured to said protective cover by hook-and-loop tape to secure said window in an open position; a plurality of adjustable straps, wherein said adjustable straps are configured to attach said protective cover to the handle or frame of said carrying device, wherein said adjustable straps are located in the center of said top surface; a handle access panel, wherein said handle access panel is integrated into said elongated panel, and wherein said handle access panel is approximately centered between said adjustable straps; and a plurality of weights, wherein said weights are integrated into said protective cover, and wherein said plurality of weights are located on the top and bottom corner of said protective cover.

In still another embodiment, the adjustable straps are about 6 inches long and 2 inches wide for a car seat, and about 10 inches or 14 inches long and 1 inch wide for a stroller.

In yet another embodiment, the present invention comprises a protective cover configured to be removably fitted to a stroller and to a protective cover of the occupant's entire body, comprising a plurality of flexible sheets, wherein said sheets form an elongated panel comprising a top surface and a bottom surface that faces said occupant, wherein said top and said bottom surface are attached along the outer edges of said top surface and said bottom surface; a built-in pocket, wherein said built-in pocket is integrated into said elongated panel by joining a portion of said top surface to a corresponding portion of said bottom surface to create a compartment area; a window, wherein said window is cut into said elongated panel, wherein said window is located below said built-in pocket, and said window is further located in front of said occupant's face; a window flap, wherein said window flap is folded and secured to said protective cover by hook-and-loop tape to secure said window in an open position; a plurality of adjustable straps, wherein said adjustable straps are configured to attach said protective cover to the handle or frame of said carrying device, wherein said adjustable straps are located along the top and bottom edge of the perimeter of said protective cover; and a plurality of weights, wherein said weights are integrated into said protective cover, and wherein said plurality of weights are located on the top and bottom corner of said protective cover.

Various objects, features, aspects and advantages of the inventive subject matter will become more apparent from the following detailed description of exemplary embodiments, along with the accompanying figures in which like numerals represent like components.

DETAILED DESCRIPTION

A protective device for an occupant carrying device is manufactured such that it protects the occupant substantially from the sun, wind, rain, and other natural and environmental elements. As used herein, and unless the context dictates otherwise, the term "protective device" is intended to include both a cover and a shade. Therefore, the terms "protective device", "cover" and "shade" may be used interchangeably.

Furthermore, as used herein, and unless the context dictates otherwise, the term "occupant" is intended to include an infant, a child or a pet. In an embodiment of the present invention, the cover is used in multiple different child carriers, restraints, child seats, children transport devices, multiple occupant strollers (e.g., strollers accommodating more than one child, such as twins or triplets, or the like), and pet strollers.

As used in the description herein and throughout the claims that follow, the meaning of "a," "an," and "the" includes plural reference unless the context clearly dictates otherwise. Also, as used in the description herein, the meaning of "in" includes "into" and "on" unless the context clearly dictates otherwise.

As used herein, the term "about" in conjunction with a numeral refers to a range of that numeral starting from 10% below the absolute of the numeral to 10% above the absolute of the numeral, inclusive.

Furthermore, in another embodiment, the material of construction for the cover is a flexible fabric that conforms to the shape of the carrying device seat and furthermore is selected based on the usage. For example, in an embodiment, the material can be air-permeable so that air can flow through the protective device, such as during warm weather. Alternatively, in another embodiment, the material can be non-air-permeable to insulate the occupant from cold air.

Furthermore, in an embodiment, the material can be water resistant to protect the occupant during wet conditions, such as rain. In other embodiments, examples of material of construction include lycra, polyester, cotton-polyester blend, rayon, flannel, fleece, cotton, or any combination of the aforementioned materials, including materials of flexible degree, and combinations of materials that are flexible along with relatively less flexible or inflexible materials. In an embodiment, the cover incorporates reflective material(s) that provide enhanced safety and visibility in the dusk and dark hours, or during inclement weather such as rain or snow. A skilled person in the art will be readily able to select a suitable material of construction for the cover based on the operating conditions and requirements in the configurations contemplated herein.

Figure 1:
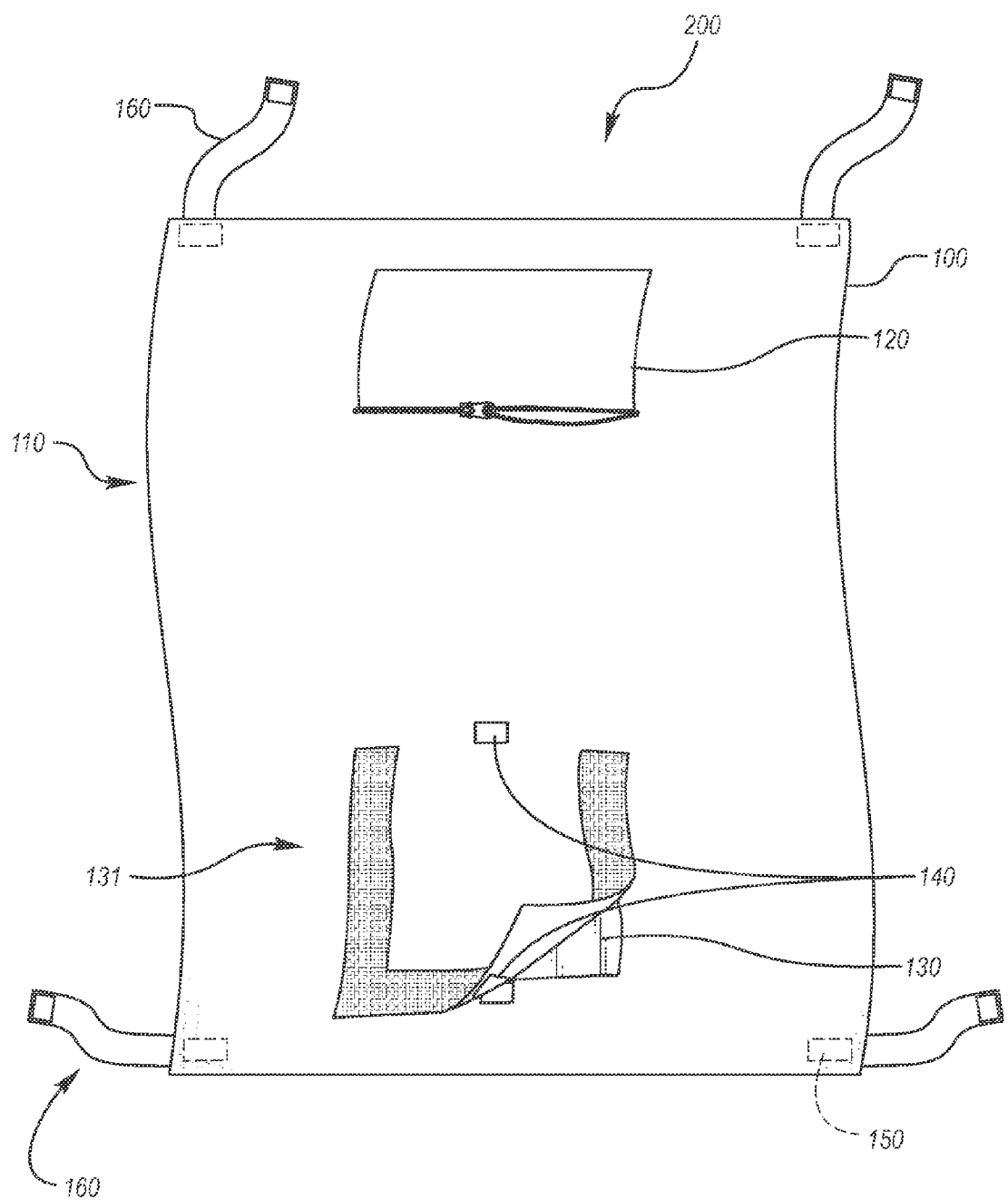
FIG. 1 is an exemplary configuration of a protective cover according to the present invention, which depicts a top view of the protective cover with adjustable straps that are located at the top and bottom edge of the protective cover.

An exemplary configuration is schematically depicted in FIG. 1, in which a protective cover 200 is designed and adapted for use in connection with a child carrying device such as a stroller (not shown). Protective cover 200 includes an elongated panel 110 comprising a top surface 100 that faces the external environment, a bottom surface (not shown) that faces the occupant, a built-in pocket 120, a window 130, a window flap 131, a plurality of adjustable straps 160, and a plurality of weights 150. As mentioned above, in an embodiment, protective cover 200 is manufactured from flexible materials that conform to the carrying device and protect the occupant from the natural environment.

In an embodiment, protective cover 200 provides a barrier from undesired touching of the child and furthermore provides a dark environment suitable for a sleeping child (not shown). In another embodiment, both top surface 100 and the bottom surface (not shown) are manufactured from a flexible air-permeable material to keep the occupant cool during warm conditions. In an embodiment, both top surface 100 and the bottom surface are manufactured from non-air-permeable and water-resistant material to shield the occupant from wind, rain and cool temperatures. In another embodiment, protective cover 200 provides full protection for the occupant from undesired touching when cover 200 is fully closed. In yet another embodiment, cover 200 incorporates reflective materials that provide enhanced safety and visibility in the dusk and dark hours.

In another embodiment, top surface 100 and the bottom surface are attached together by a closing mechanism around the perimeter of protective cover 200. In another embodiment, top surface 100 and the bottom surface are sewn together along the outer edges as required by appropriate methods and such methods common in the state of the art. In one or more embodiments, top surface 100 and the bottom surface can be attached together using, for example, fabric glue or other suitable fastening material. In an embodiment, cover 200 is of a size such that it is sufficiently long and wide to substantially cover the occupant's body and limbs. For example, in an embodiment, protective cover 200 is about 44 inches long and about 27 inches wide for a car seat, and about 52 inches long and about 32 inches wide for a stroller. Alternatively, in an embodiment, cover 200 is about 40 inches to 46 inches long and about 19 inches to 29 inches wide for a car seat, and about 50 inches to 54 inches long and about 30 inches to 34 inches wide for a stroller. One of ordinary skill in the art can envision other dimensions which may vary with the type of stroller or any carrying device but not detract from the spirit of the invention.

In an embodiment, protective cover 200 fully covers an occupant's entire body. In another embodiment, protective cover 200 also provides a dark environment for a sleeping occupant when protective cover 200 is in place and window 130 is fully closed. In one or more embodiments, protective cover 200 is manufactured to provide protection for the multiple occupant carrying device, such as double or triple strollers. For example, strollers are optionally configured as "double-wide" or "triple-wide", whereby the size of such double or triple stroller is proportionally larger in several dimensions when compared with a standard stroller. In one or more embodiments, the associated cover of the invention is correspondingly sized to match such optional stroller configurations.

In an embodiment, protective cover 200 is configured to allow some air flow through the sides of the carrying device and prevent air pressure build-up between the carrying device and protective cover 200, so maneuvering the carrying device is not hindered. In another embodiment, when protective cover 200 is in an open position, protective cover 200 can be folded in half, due to its flexible material, to allow full access to the occupant or the stroller without having to fully remove protective cover 200 from the stroller. This feature reduces the need for the parent or caregiver to carry an extra item while maneuvering the carrying device.

In another embodiment, built-in pocket 120 is manufactured by stitching a portion of top surface 100 to a corresponding portion of the bottom surface to create a compartment area. Built-in pocket 120 is sufficiently large to provide storage space for items needed for both the occupant and caregiver such as diapers, wipes, wallets, cell phones, toys, trash bags, snacks, a water bottle, and other items based on the occupant's and the caregiver's needs. In one embodiment, built-in pocket 120 is about 7 inches long and about 12 inches wide. Alternatively, in an embodiment, built-in pocket 120 is about 5 inches to 9 inches long, and about 10 inches to 14 inches wide. In another embodiment, built-in pocket 120 is closed by a zipper (as shown in FIG. 1), however, other closing mechanisms can be employed such as snaps, ties or hook-and-loop tape.

In an embodiment, window 130 is cut into elongated panel 110 and located approximately below pocket 120 of protective cover 200 (see FIG. 1). In another embodiment, window 130 is located in front of the face of a child and allows the child to view external objects and/or provides the parent with a view of the child or occupant. In one embodiment, window 130 for a car seat has a height of about 5 inches, a width of about 7 inches, and the bottom border of window 130 is located about 11 inches from the bottom edge of elongated panel 110. Alternatively, in an embodiment, window 130 for a car seat has a height of about 3 inches to 7 inches, a width of about 5 inches to 9 inches, and the bottom border of the window 130 is located about 9 inches to 13 inches from the bottom edge of elongated panel 110. In another embodiment, window 130 for a stroller has a height of about 10 inches, a width of about 10 inches, and the bottom border of window 130 is located about 17 inches from the bottom edge of elongated panel 110.

Alternatively, in an embodiment, window 130 for a stroller has a height of about 8 inches to 12 inches, a width of about 8 inches to 12 inches, and the bottom border of window 130 is located about 15 inches to 19 inches from the bottom edge of elongated panel 110.

In an embodiment, window flap 131 is created by cutting into elongated panel 110 such that the cut-out portion is window 130 and the remaining portion (window flap 131) fully covers window 130 (see FIG. 1). In yet another embodiment, the cut edges of elongated panel 110 that form window 130 and window flap 131 are sewn or glued together along the perimeter of window 130 and window flap 131, respectively, to ensure the integrity of elongated panel 110 is intact such that top surface 100 and the bottom surface are connected to each other to form window 130 and window flap 131.

In an embodiment, window flap 131 is secured to protective cover 200 by suitable fastening means 140, such as hook-and-loop tape, elastic, buttons, or snaps. In another embodiment, window flap 131 is folded and secured to cover 200 by hook-and-loop tape to elongated panel 110 to maintain window flap 131 in an open position.

In another embodiment, window flap 131 is connected to elongated panel 110 and secured to cover 200 along two or three edges of window flap 131 that are not the main attachment points. For example, in an embodiment, where window flap 131 is connected via its attachment point to cover 200, the remaining edges of window flap may be secured to elongated panel 110 to avoid such window flap 131 from undesired opening or movement such as in windy or rainy conditions. In a further embodiment, window flap 131 is connected to elongated panel 110 along one edge of window flap 131.

In another embodiment, window flap 131 is created by cutting into elongated panel 110 such that all four sides of window 130 are cut, creating a hole in elongated panel 110. The removed portion becomes window flap 131. In this embodiment, additional fabric is sewn around the bottom and side perimeter of window flap 131 such that the length is expanded by 1 inch on three sides that are not sewn back into elongated panel 110. In this embodiment, window flap 131 is then resecured to elongated panel 110 by sewing the top edge of window flap 131 to the top edge of window 130.

Figure 5:
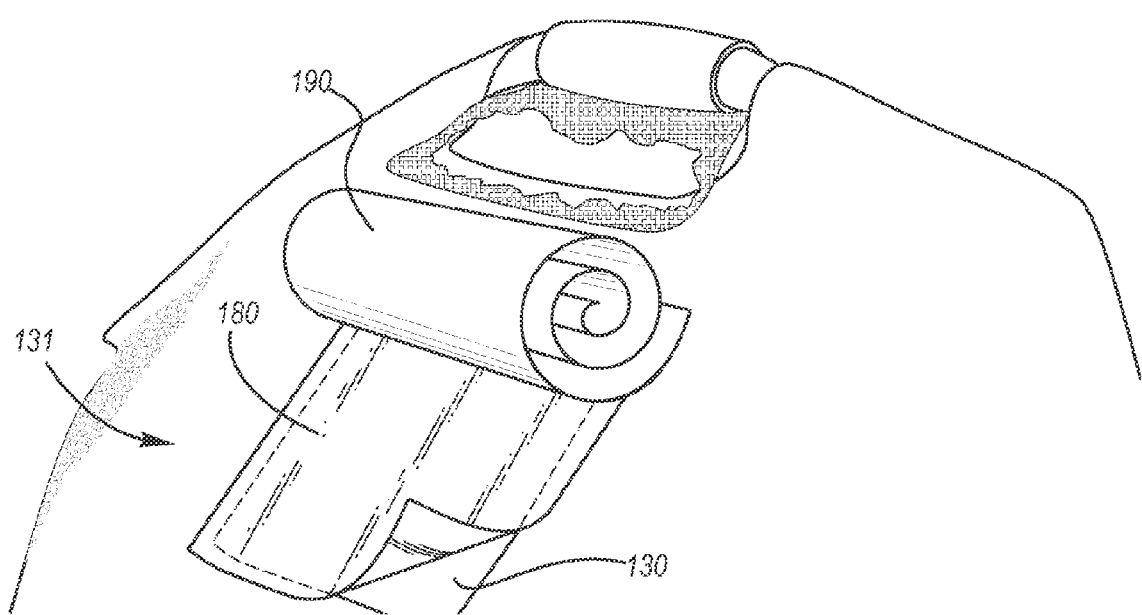
FIG. 5 is an exemplary configuration of a window of a protective cover according to the present invention, which depicts a front view of a multi-layer window flap in a folded position for a stroller and/or a child car seat.

In one example, window flap 131 is made of multiple layers of fabric providing a multitude of embodiments (see FIG. 5). In one embodiment, window flap 131 comprises two layers of fabric: first transparent layer 180 and second opaque layer 190. In another embodiment, first transparent layer 180 and second opaque layer 190 are sewn so that one layer rests directly on the top of the other, for example, such that second opaque layer 190 layer lies on the top of first transparent layer 180 (as shown in FIG. 5). In such a configuration, second transparent layer 190 is directly in front of an occupant's face. In a further embodiment, second opaque layer 190 of window flap 131 is folded and secured to protective cover 200 by hook-and-loop tape to maintain second opaque layer 190 of window flap 131 in an open position while second transparent layer 180 of window flap 131 remains closed, thus providing an occupant the ability to view outside while the occupant is protected from cold, wind, and rain. In yet another embodiment, by folding both first transparent layer 180 and second opaque layer 190 of window flap 131 (not shown) so that the two layers 180 and 190 together are completely laid back onto cover 200, such that window 130 is fully opened, there is provided fresh air while providing the parent with convenient access to a child in order to provide the child with a bottle, a toy, or to attend to the child's needs. In another embodiment, by unfolding both first transparent layer 180 and second opaque layer 190 of window flap 131, such that window 130 is fully closed, there is provided a dark environment for a resting or sleeping child (not shown).

Figure 2:
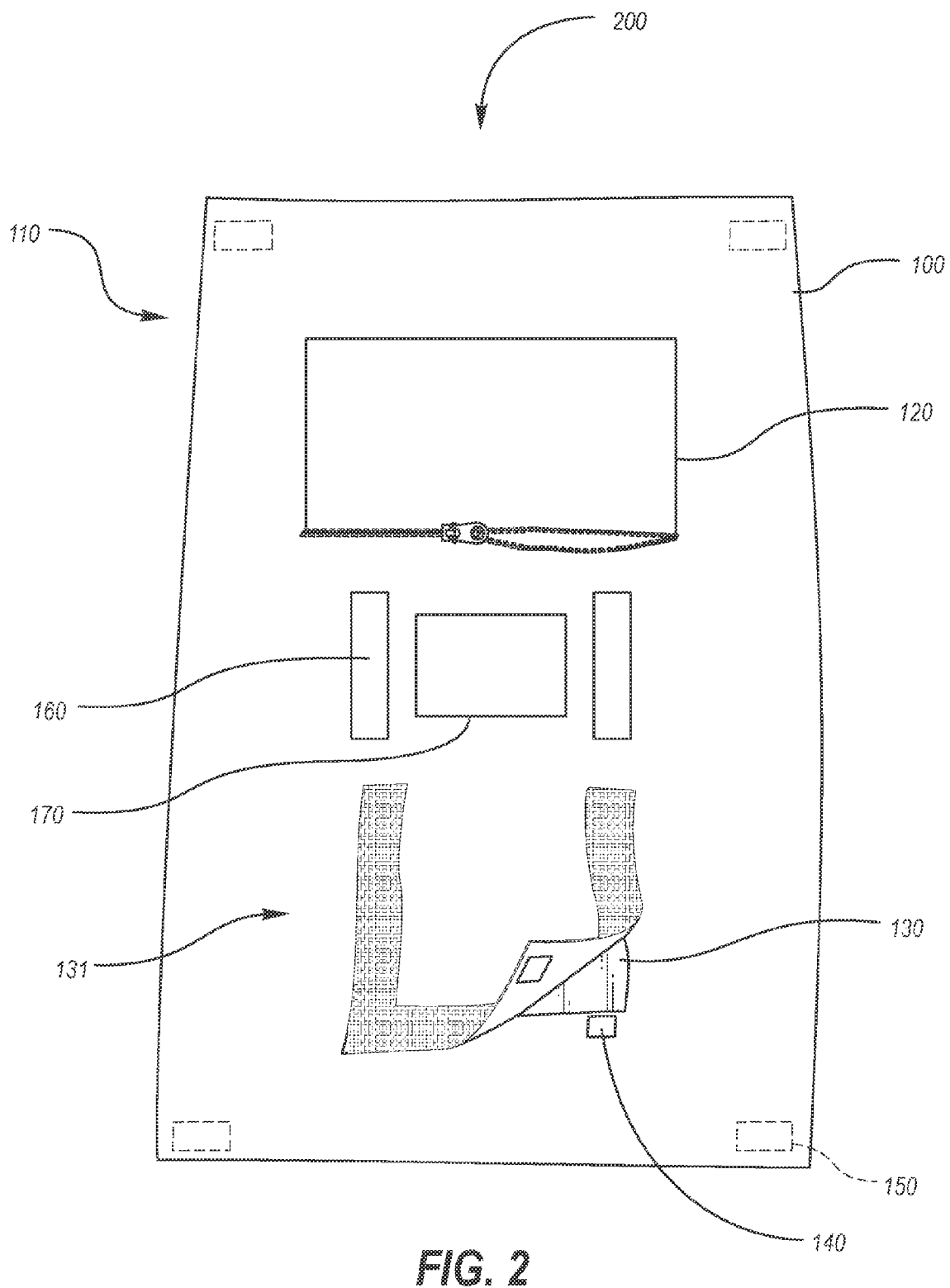
FIG. 2 is an exemplary configuration of a protective cover according to the present invention, which depicts a top view of the protective cover with adjustable straps that are located in the center of the protective cover.
Figure 6:
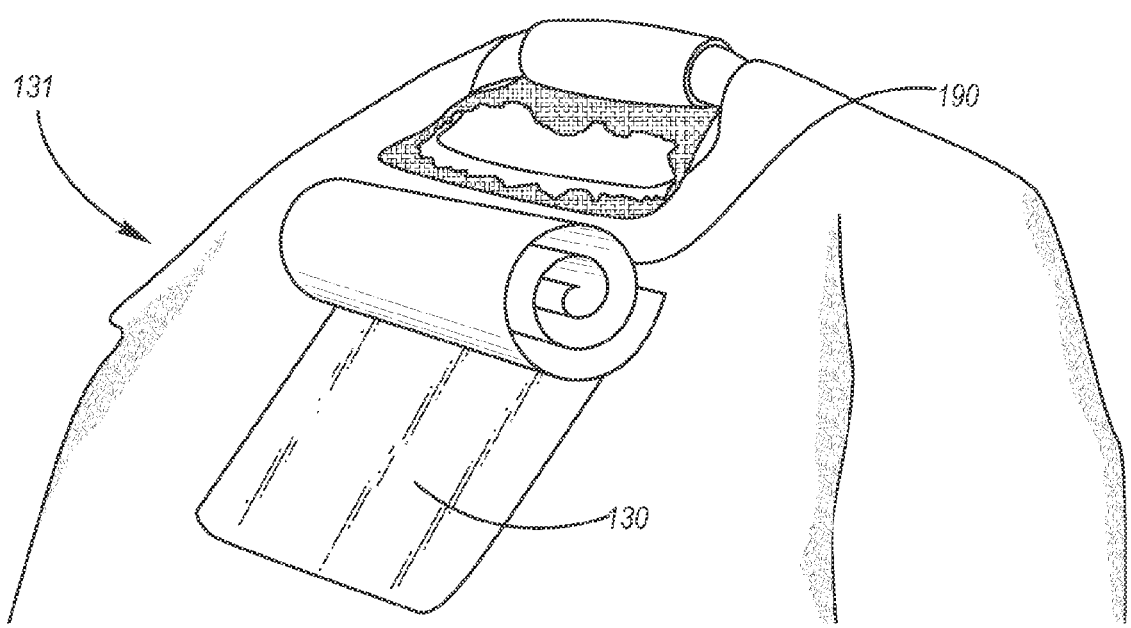
FIG. 6 is an exemplary configuration of a window of a protective cover according to the present invention, which depicts a front view of a single layer window flap in a folded position for a stroller and/or a car seat.

In one example, window flap 131 is made of a single layer of fabric providing a multitude of embodiments (see FIG. 2). In one embodiment, window flap 131 comprises one layer of transparent material. In this embodiment, the transparent single layer of window flap 131 is unfolded and thus causes window 130 to be closed, and the occupant is thereby protected while allowing visual access for both the occupant and the parent. In yet another embodiment, window flap 131 comprises one single layer of opaque material 190. In this embodiment, single layer of opaque material 190 of window flap 131 is folded and thus causes window 130 to be open, and the parent is thereby able to attend to the occupant's needs (see FIG. 6). In a further embodiment, when single layer of opaque material 190 of window flap 131 is unfolded, window 130 is closed, thus there is provided a darkened environment for the sleeping occupant (not shown).

In an embodiment, window flap 131 is manufactured of the same material as cover 200, for example, lycra, polyester, cotton-polyester blend, rayon, flannel, fleece, cotton, or any combination of the aforementioned materials. In another embodiment, window flap 131 is manufactured of a clear, opaque, semi-opaque, or any such combination of colored materials. In a further embodiment, window flap 131 is manufactured of a mesh material that is optionally colored, clear, opaque, or semi-opaque.

In one embodiment, window flap 131 for a car seat has a height of about 7 inches, a width of about 9 inches, and the bottom border of window flap 131 is located about 13 inches from the bottom edge of elongated panel 110. Alternatively, in an embodiment, window flap 131 for a car seat has a height of about 5 inches to 9 inches, a width of about 7 inches to 11 inches, and the bottom border of the window flap 131 is located about 12 inches to 15 inches from the bottom edge of elongated panel 110.

In another embodiment, window flap 131 for a stroller has a height of about 12 inches, a width of about 12 inches, and the bottom border of window flap 131 is located about 19 inches from the bottom edge of elongated panel 110. Alternatively, in an embodiment, window flap 131 for a stroller has a height of about 10 inches to 14 inches, a width of about 10 inches to 14 inches, and the bottom border of window flap 131 is located about 17 inches to 21 inches from the bottom edge of elongated panel 110.

In one embodiment, protective cover 200 optionally includes weights 150 located on the top and bottom corners of protective cover 200, as shown in FIGS. 1, 2, 3, 4a, and 4b. In another embodiment, weights 150 are incorporated in protective cover 200 by a suitable attachment mechanism. In yet another embodiment, weights 150 are secured in place by sewing between the top surface 100 and the bottom surface (not shown). In another embodiment, weights 150 are light weights that provide sufficient additional weight to keep cover 200 in place and furthermore to prevent cover 200 from blowing in the wind. Thus, the occupant, in particular a sleeping baby, will not be disturbed, and cover 200 protects any occupant from environmental elements by securing such cover 200 in place. In yet another embodiment, small pockets are created along the top and the bottom corner of elongated panel 110 such that weights 150 are removably inserted into the small pockets and held in place by hook-and-loop tape or other conventional closing mechanism.

In another embodiment, weights 150 are manufactured from steel without any lead and weigh about one ounce each, but may also vary in weight from about 0.2 to 2 ounces each. In certain embodiments, weights 150 are drapery weights, weighing from about 0.5 to 2 ounces. In an embodiment, weights 150 are 1 ounce each. In one or more embodiments, weights 150 are 1⅞ inch triangles, weighing from about 0.5 to 1 ounces. In one or more embodiments, weights 150 are weighted rope made from 4/32 inches white cotton sausage bead weighted tape, weighing about 1 ounce per yard.

Figure 3:
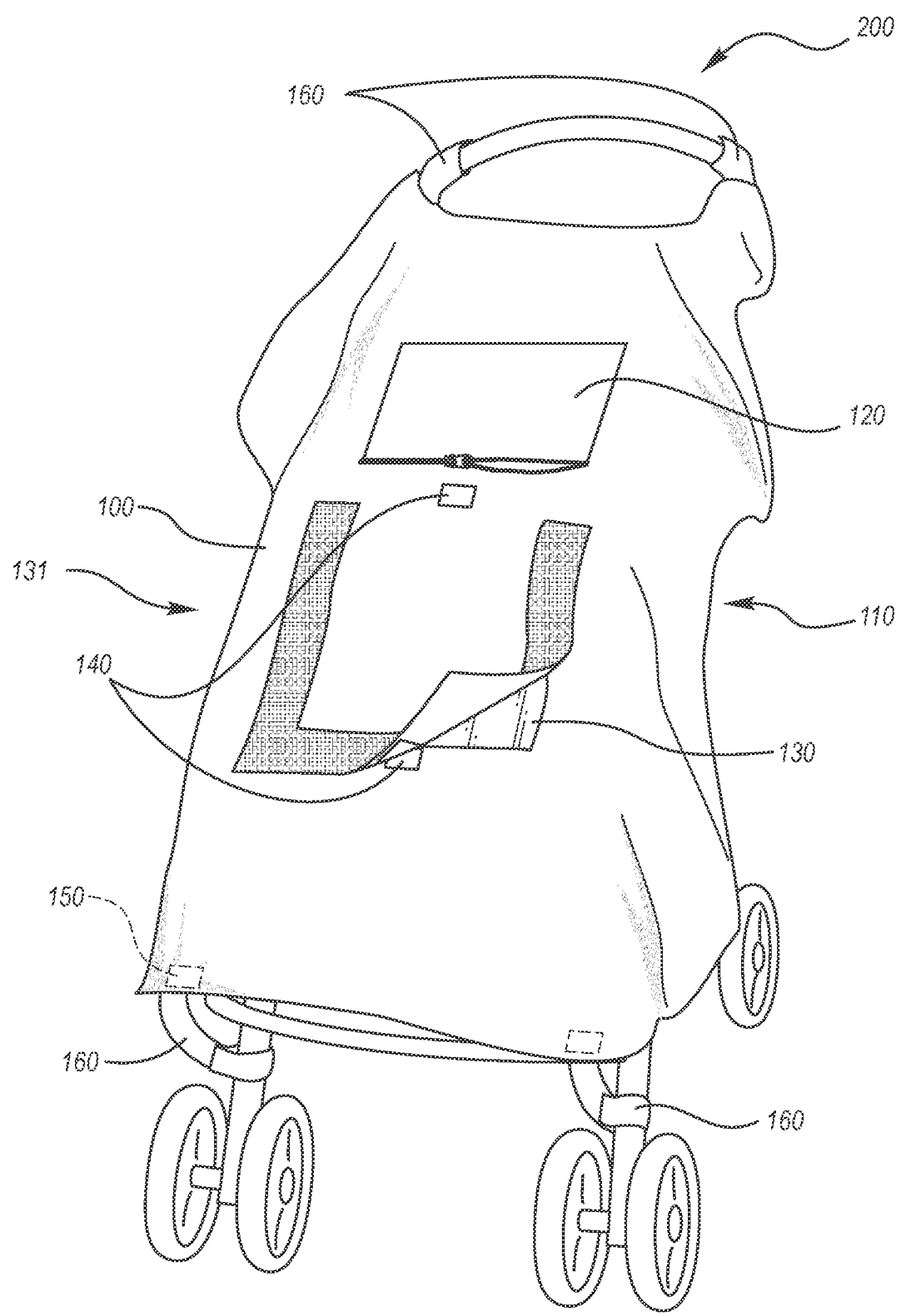
FIG. 3 is an exemplary configuration of a protective cover according to the present invention, which depicts the protective cover fitted about a stroller.

In one or more embodiments, protective cover 200 is removably attached to the carrying device by use of adjustable straps 160. In an embodiment, adjustable straps 160 are located along the top and the bottom edges of the perimeter of protective cover 200 on the opposing corners of the same edge, as shown in FIGS. 1 and 3 for use with a stroller. In one or more embodiments, adjustable straps 160 fold in half to wrap around the handle or frame of the carrying device. In an embodiment, one end of each individual adjustable strap 160 is wrapped around the handle and attached to the middle portion of the same individual adjustable strap 160, as shown in FIG. 3.

In one example, adjustable straps 160 are located in the center of top surface 100 as shown in FIG. 2, which straps 160 are located about 11 inches apart, for use with an infant/child car seat. Alternatively, in another embodiment, adjustable straps 160 are located about 9 inches to 13 inches apart for use with an infant/child car seat. In another embodiment, adjustable straps 160 are located in the center of the bottom surface (not shown), which straps 160 are located about 11 inches apart, such as for use with an infant/child car seat.

Figure 4A:
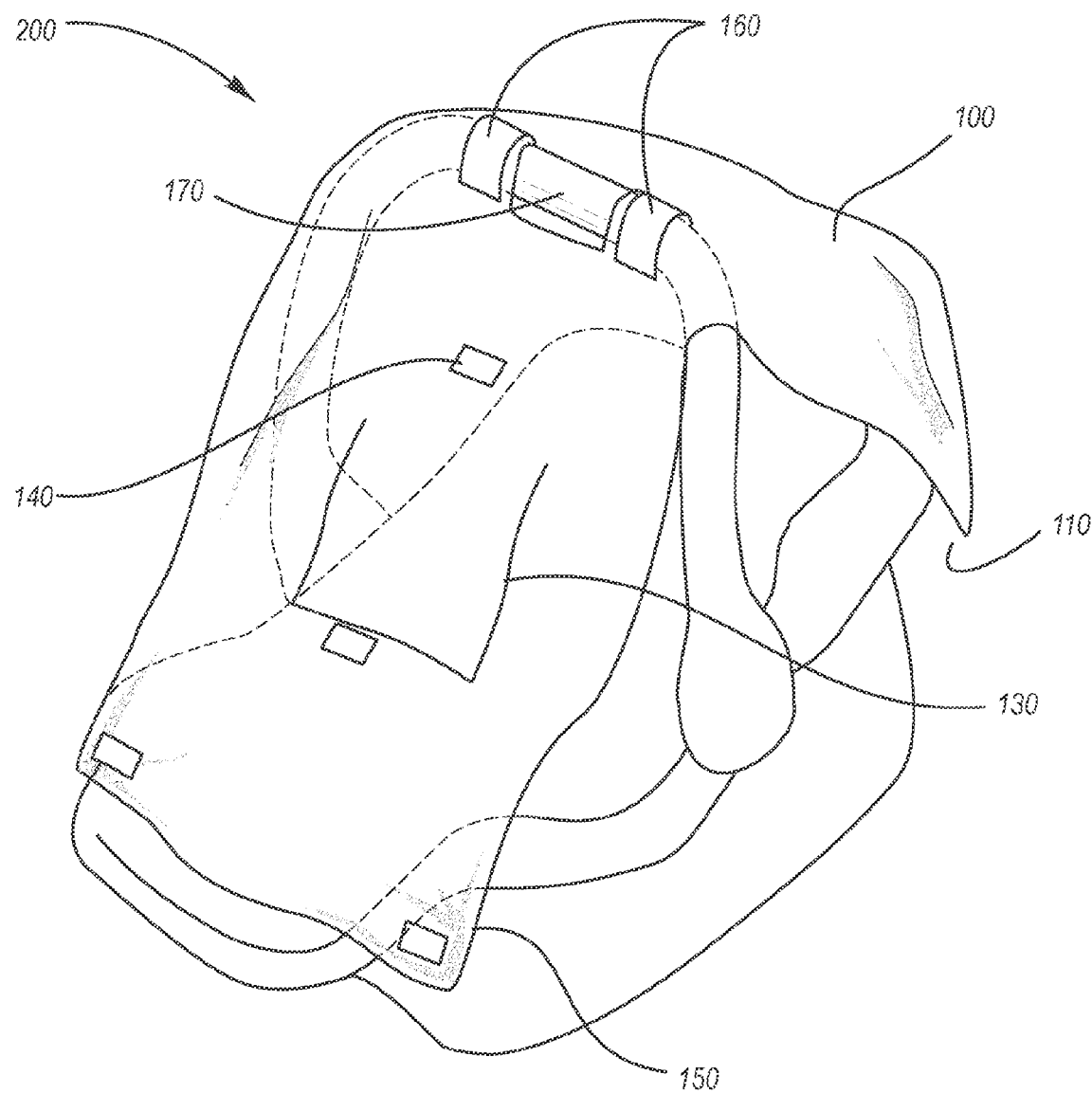
FIG. 4a is an exemplary configuration of a protective cover according to the present invention, which depicts a front view of the protective cover fitted about a child car seat.
Figure 4B:
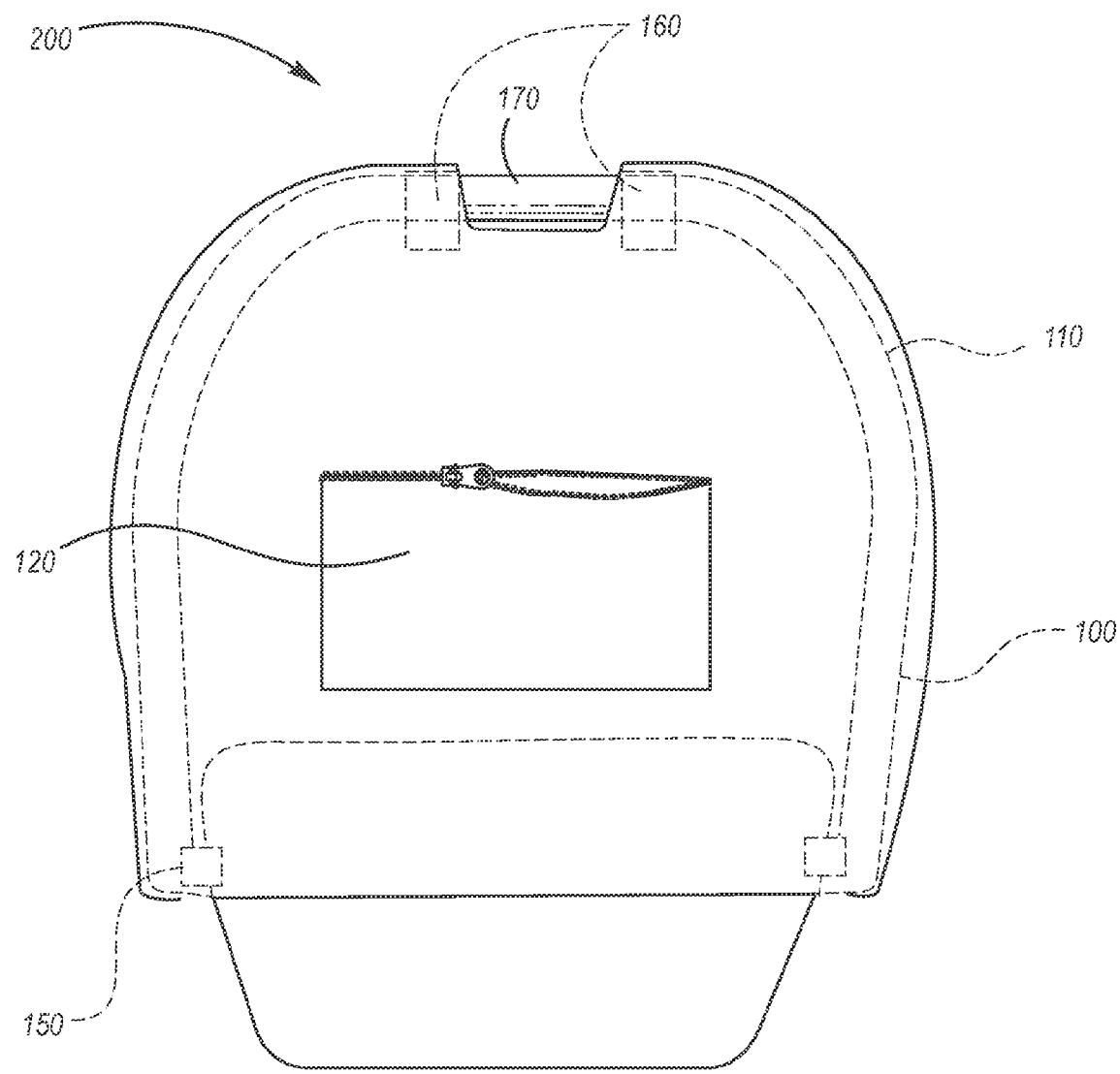
FIG. 4b is an exemplary configuration of a protective cover according to the present invention, which depicts a rear view of the protective cover fitted about a child car seat.

FIGS. 4a and 4b depict an embodiment of protective cover 200 fitted about a infant/child car seat. As shown in these figures, adjustable straps 160 are located in the center of top surface 100 and adjustable straps 160 are located about 11 inches apart. Alternatively, as mentioned above, in another embodiment, adjustable straps 160 are located about 9 inches to 13 inches apart for use with an infant/child car seat.

In one embodiment, adjustable straps 160 are manufactured from flexible material and employ elongated pieces of hook-and-loop tape, allowing the straps to be adjustable so that adjustable straps 160 are tightly secured around child carriers of varying height and width. In one embodiment, adjustable straps 160 are about 6 inches long and 2 inches wide for a car seat, and are about 10 inches to 14 inches long and about 1 inch wide for a stroller. Alternatively, in another embodiment, adjustable straps 160 are about 4 inches to 8 inches long, and about 0.5 inch to 4 inches wide for a car seat. In another embodiment, adjustable straps 160 are about 8 inches to 16 inches long and about 0.5 inch to 2 inches wide for a stroller.

In one embodiment, hook-and-loop tape is sewn on the bottom edge of both adjustable straps 160, allowing adjustable straps 160 to be adjusted when employed in conjunction with a carrying device. In one or more embodiments, adjustable straps 160 are sewn directly onto cover 200, depending on the intended use of the carrying device. Adjustable straps 160 are adjustable so they can fit any width/height of the handle or frame of the carrying device. For example, in one embodiment, adjustable straps 160 are adjusted (i.e., tightened) by using the hook-and-loop tape. In another embodiment, adjustable straps 160 are looped around a stroller handle or frame once (as shown in FIG. 3) or twice to tighten/shorten adjustable straps 160. One advantage of the adjustable strap 160 design is that it allows one to access the carrying device's handle without interfering with the utility of the child carrying device, as shown in FIG. 3. In an embodiment, adjustable straps 160, where incorporated with a small collapsible shade that is included on most carriers above the child's head, allow protective cover 200 to be suspended comfortably above the child without obstruction of the child's sitting space, as depicted in FIG. 3.

In one or more embodiments, adjustable straps 160 comprise partial hook-and-loop tape that may extend the entire length of each adjustable strap 160 (not shown), or extend partially toward the end of each adjustable strap 160 (not shown).

In an embodiment, for an infant/child car seat, cover 200 includes a handle access panel 170 that is located approximately centered between adjustable straps 160, when adjustable straps 160 are located in the center of top surface 100 as shown in FIGS. 2, 4a and 4b. In another embodiment, handle access panel 170 is secured to protective cover 200 by suitable fastening means 140, such as hook-and-loop tape, elastic, buttons, or snaps. In yet another embodiment, handle access panel 170 can be opened to allow access to the handle of the carrier or closed to provide full protection of the occupant from the natural environment. In an embodiment, handle access 170 is manufactured of the same material as protective cover 200, for example, lycra, polyester, cotton-polyester blend, rayon, flannel, fleece, cotton, or any combination of the aforementioned materials.

In one embodiment, handle access panel 170 has a height of about 4 inches, a width of about 5 inches, and the bottom border of handle access panel 170 is located about 20 inches from the bottom edge of elongated panel 110. Alternatively, in another embodiment, handle access panel 170 for a car seat has a height of about 3 inches to 7 inches, a width of about 4 inches to 8 inches, and the bottom border of the handle access panel 170 is located about 18 inches to 22 inches from the bottom edge of elongated panel 110.

Thus, specific embodiments of a protective cover for a child carrying device and methods to employ such cover have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A protective cover configured to be removably fitted to an occupant carrying device, said protective cover comprising:
   a) a plurality of flexible sheets, wherein said sheets form an elongated panel comprising a top surface and a bottom surface;
   b) a built-in pocket, wherein said built-in pocket is integrated into said elongated panel by stitching a portion of said top surface of at least one of said flexible sheets to a corresponding portion of said bottom surface of at least one of said flexible sheets to create a compartment area;
   c) a window, wherein said window is cut into said elongated panel;
   d) a window flap, wherein said window flap comprises a first layer of transparent material and a second layer of opaque material, and wherein said window flap is capable of being folded and secured to said protective cover by hook-and-loop tape to secure said window in an open position and provide visual and physical access to said occupant; and
   e) a plurality of adjustable straps, wherein said adjustable straps are configured to attach said protective cover to the handle or frame of said carrying device;
   wherein when said protective cover is in an open position, said protective cover is partially foldable to allow full access to said occupant in said carrying device without having to completely remove said protective cover from said carrying device.

2. The protective cover according to claim 1, further comprising a handle access panel integrated into said elongated panel, wherein said handle access panel is centered between said adjustable straps, and wherein said adjustable straps are located in the center of said top surface.

3. The handle access panel according to claim 2, wherein said handle access panel is about 3 inches to 7 inches in length, and about 4 inches to 8 inches in width,
   wherein the bottom border of said handle access panel is located about 18 inches to 22 inches from the bottom edge of said elongated panel; and
   wherein said handle access panel is fastened to said protective cover by a fastening mechanism comprising elastic, buttons, hook-and-loop tape, or snaps.

4. The protective cover according to claim 1, wherein said carrying device comprises an infant seat, a child seat, a stroller, a multiple occupant stroller, or a pet stroller.

5. The protective cover according to claim 1, wherein said flexible sheets further comprise lycra, polyester, cotton-polyester blend, rayon, flannel, fleece, cotton, or any combination thereof.

6. The protective cover according to claim 1, wherein said window flap comprises:
   one or more layers of lycra, polyester, cotton-polyester blend, rayon, flannel, fleece, cotton, or any combination thereof; or
   a clear, opaque, semi-opaque; or
   a mesh material that is optionally colored, clear, opaque, or semi-opaque.

7. The protective cover according to claim 1, wherein said adjustable straps removably attach said protective cover to said carrying device, wherein said adjustable straps are located in the center of said top surface, wherein said adjustable straps are about 9 inches to 13 inches apart, and wherein said adjustable straps comprise flexible fabric.

8. The protective cover according to claim 1, wherein said adjustable straps are located along the top and bottom edge of said protective cover.

9. The protective cover according to claim 1, wherein said built-in pocket is configured to provide storage.

10. The protective cover according to claim 1, wherein said window flap is fastened to said protective cover by a fastening mechanism comprising elastic, buttons, hook-and-loop tape, or snaps to secure said window in a closed position.

11. The protective cover according to claim 1, wherein said window is located directly below said built-in pocket, wherein said window is further located in front of the face of said occupant to provide visual access for said occupant.

12. The protective cover according to claim 1, wherein said window flap comprises a first layer of transparent material and a second layer of opaque material, wherein said layer of opaque material is folded and secured to said protective cover by hook and loop tape to maintain said layer of opaque material in an open position, while said first layer of transparent material is closed, further providing an occupant fresh air and visual access.

13. The protective cover according to claim 1, further comprising a plurality of weights, wherein said weights are integrated into said protective cover, wherein said weights are sewn into the four corners of said elongated panel, wherein said weights are selected from fabric weights, drapery weights, and weighted rope, and wherein said weights are about 0.5 to 2 ounces each.

14. The protective cover according to claim 1, wherein said protective cover comprises air-permeable material, non-air-permeable material, or a combination thereof.

15. The protective cover according to claim 1, wherein said elongated panel is about 40 inches to 54 inches long, and about 19 inches to 34 inches wide.

16. The protective cover according to claim 1, wherein said adjustable straps are about 6 inches to 14 inches long and about 1 inch to 2 inches wide.

17. A protective cover configured to be removably fitted to a car seat and to cover an occupant's entire body, said protective cover comprising:
   a) a plurality of flexible sheets, wherein said sheets form an elongated panel comprising a top surface and a bottom surface that faces said occupant, wherein said top and said bottom surface are attached together along the outer edges of said top surface and said bottom surface;
   b) a built-in pocket, wherein said built-in pocket is integrated into said elongated panel by stitching a layer of said top surface to a corresponding layer of said bottom surface to create a compartment area;
   c) a window, wherein said window is cut into said elongated panel, wherein said window is located below said built-in pocket, and said window is further located in front of said occupant's face;
   d) a window flap, wherein said window flap comprises a first layer of transparent material and a second layer of opaque material, wherein said window flap is capable of being folded and secured to said protective cover by hook-and-loop tape to secure said window in an open position, to further provide visual and physical access to said occupant;
   e) a plurality of adjustable straps, wherein said adjustable straps are configured to attach said protective cover to the handle or frame of said carrying device, wherein said adjustable straps are located in the center of said top surface;
   f) a handle access panel, wherein said handle access panel is integrated into said elongated panel, and wherein said handle access panel is approximately centered between said adjustable straps; and
   g) a plurality of weights, wherein said weights are integrated into said protective cover, and wherein said plurality of weights are located on the top and bottom corner of said protective cover;
wherein when said protective cover is in an open position, said protective cover is partially foldable to allow full access to said occupant in said carrying device without having to completely remove said protective cover from said carrying device.

18. The protective cover according to claim 17, wherein said window flap comprises:
   one or more layers of lycra, polyester, cotton-polyester blend, rayon, flannel, fleece, cotton, or any combination thereof; or
   a clear, opaque, semi-opaque; or
   a mesh material that is optionally colored, clear, opaque, or semi-opaque.

19. A protective cover configured to be removably fitted to a stroller and to cover an occupant's entire body, said protective cover comprising:
   a) a plurality of flexible sheets, wherein said sheets form an elongated panel comprising a top surface and a bottom surface facing said occupant, wherein said top and said bottom surface are attached together along the outer edges of said top surface and said bottom surface;
   b) a built-in pocket, wherein said built-in pocket is integrated into said elongated panel by stitching a layer of said top surface to a corresponding layer of said bottom surface to create a compartment area;
   c) a window, wherein said window is cut into said elongated panel, wherein said window is located below said built-in pocket, and said window is further located in front of said occupant's face;
   d) a window flap, wherein said window flap comprises a first layer of transparent material and a second layer of opaque material, wherein said window flap is capable of being folded and secured to said protective cover by hook-and-loop tape to secure said window in an open position to further provide visual and physical access to said occupant;
   e) a plurality of adjustable straps, wherein said adjustable straps are configured to attach said protective cover to the handle or frame of said carrying device, wherein said adjustable straps are located along the top and bottom edge of said protective cover; and
   f) a plurality of weights, wherein said weights are integrated into said protective cover, and wherein said plurality of weights are located on the top and bottom corner of said protective cover;
wherein when said protective cover is in an open position, said protective cover is partially foldable to allow full access to said occupant in said carrying device without having to completely remove said protective cover from said carrying device.

* * * * *